United States Patent [19]
Kubát et al.

[11] Patent Number: 4,563,324
[45] Date of Patent: Jan. 7, 1986

[54] METHOD OF INJECTION MOULDING

[76] Inventors: Josef Kubát, Solparksvägen 3, S-1710 35 Solna; Jan-Anders E. Månson, Abborrstige, S-28b 00 Örkelljunga, both of Sweden

[21] Appl. No.: 549,636

[22] Filed: Nov. 7, 1983

Related U.S. Application Data

[60] Continuation of Ser. No. 317,422, Nov. 2, 1981, abandoned, which is a division of Ser. No. 196,553, May 20, 1980, abandoned.

[30] Foreign Application Priority Data

Sep. 29, 1978 [SE] Sweden .................. 7810264

[51] Int. Cl.⁴ ................................. B29F 1/00
[52] U.S. Cl. ........................ 264/328.13; 264/328.19; 425/555
[58] Field of Search ............. 264/40.5, 328.7, 328.13, 264/328.19; 425/146, 555, 557, 562

[56] References Cited

U.S. PATENT DOCUMENTS

| Re. 28,721 | 2/1976 | Farrell | 425/555 |
| 4,066,725 | 1/1978 | Boettner | 264/40.5 |
| 4,237,089 | 12/1980 | Kubat et al. | 264/328.1 |

FOREIGN PATENT DOCUMENTS

| 461789 | 10/1968 | Fed. Rep. of Germany . |
| 2548752 | 5/1976 | Fed. Rep. of Germany ...... 425/555 |
| 584105 | 1/1977 | Fed. Rep. of Germany . |
| 314197 | 9/1969 | Sweden . |
| 320492 | 2/1970 | Sweden . |
| 912695 | 12/1962 | United Kingdom ........... 264/328.13 |

*Primary Examiner*—Donald Czaja
*Assistant Examiner*—V. Fischbach
*Attorney, Agent, or Firm*—Cushman, Darby & Cushman

[57] ABSTRACT

A pressure generating device for use in injection moulding at a high pressure or normal pressure where the pressure generating device is attached to the mould, the platens, the tie bars or other suitable parts of the injection moulding machine which device operates separately from the normal pressure generating mechanism and acts on the content of the mould cavity only, said device comprising a pressure generating part, e.g. a hydraulic cylinder (1) connected with a plunger (2) which can bring the pressure inside the cavity to the desired level during an injection cycle and a non-return flow valve (3) or any other element closing the mold cavity from the injection side, and the use of said device in injection moulding at high pressure or normal pressure.

5 Claims, 12 Drawing Figures

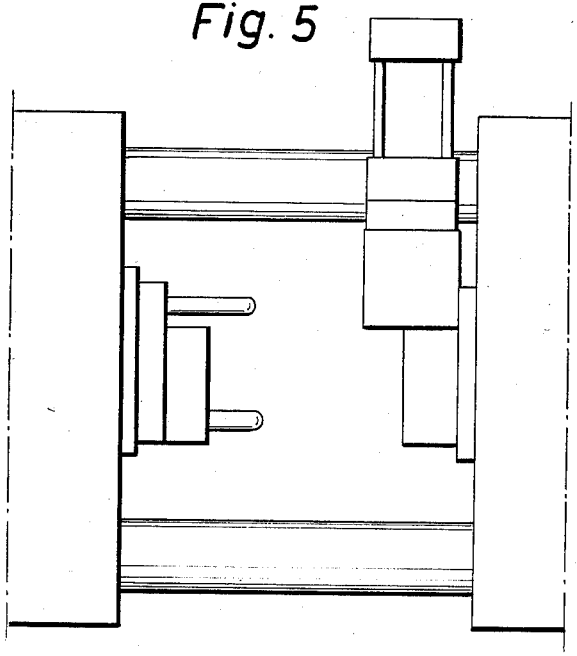
Fig. 5
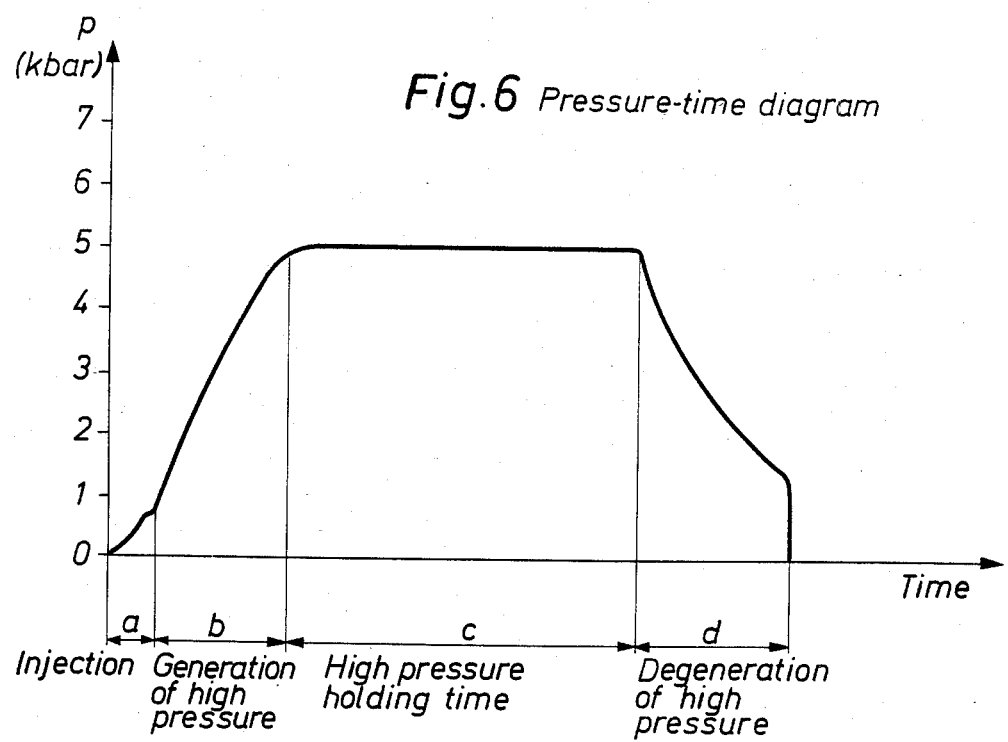
Fig. 6 Pressure-time diagram

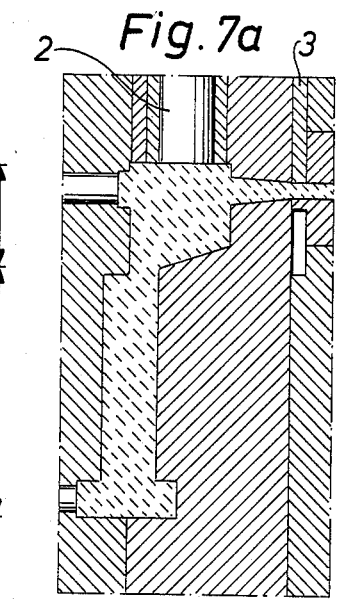
Fig. 7a
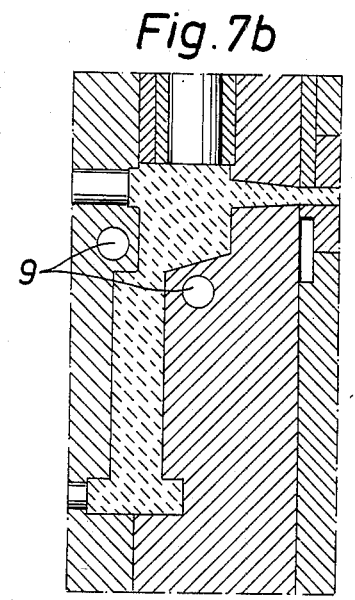
Fig. 7b
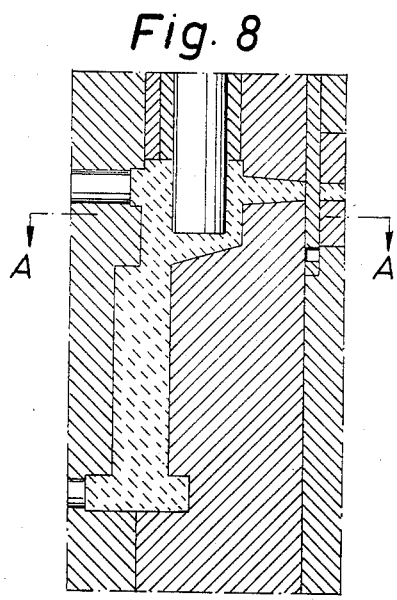
Fig. 8
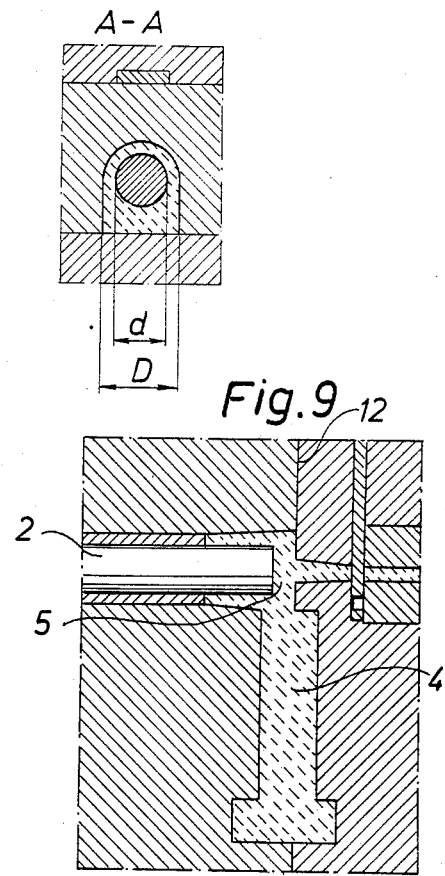
A-A
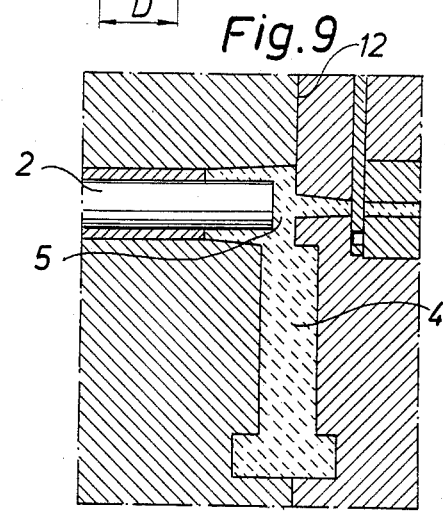
Fig. 9

Fig. 10 Sequence diagram
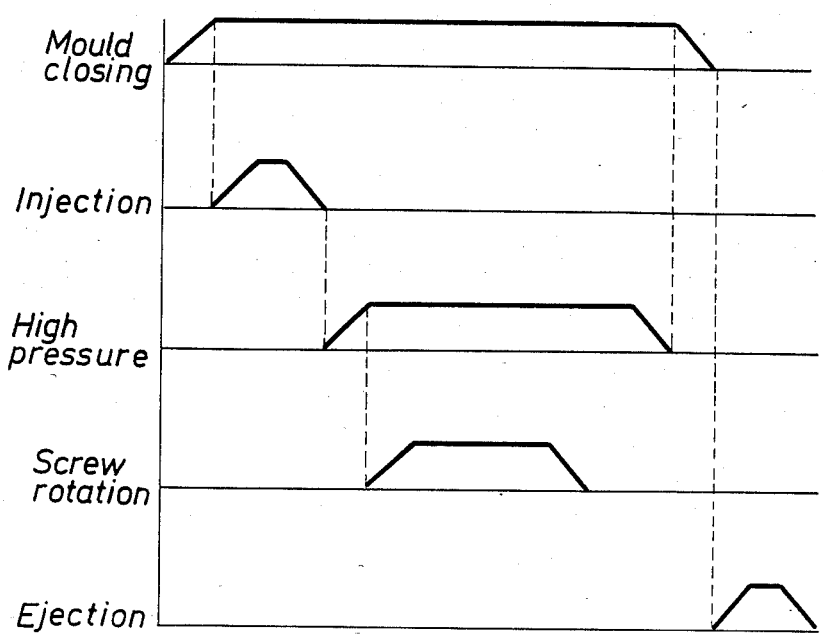
Fig. 11
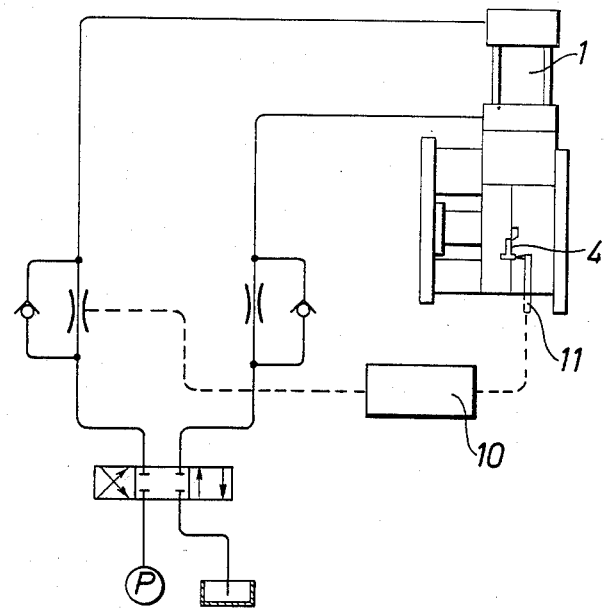

METHOD OF INJECTION MOULDING

This is a continuation of application Ser. No. 317,422, filed Nov. 2, 1981, now abandoned which was a division of application Ser. No. 196,553, filed May 20, 1980 and now abandoned.

From the Swedish Patent Specification No. 401,129 it is previously known that a substantial increase of the pressure in the moulding of thermoplastic articles by means of injection moulding has a number of positive effects on the properties of the article and at the same time provides certain technical process advantages. Thus, in the injection moulding of certain crystalline thermoplastic resins, especially polyethylene of high density, a remarkable increase of the stiffness and the breaking stress of the final product is observed when the pressure in the mould cavity in connection with the production of the article has been increased to 300–500 MPa. At the same time a mould shrinkage decreasing with increasing pressure in a controllable way was observed. A number of other properties were also remarkably improved such as e.g. the resistance against flow under stress. The internal stresses normally present in injection moulded articles also could be greatly reduced; at the highest pressures (500 MPa) used in said context, they could practically be removed. Said effect could be traced back to the instantaneous solidification of the melt in the cavity which is obtained at a sufficiently high pressure as a result of the increase of the glass transition temperature or melt temperature with the pressure. The previously mentioned increase in the stiffness and breaking strength of the final product was especially pronounced for high molecular qualities of polyethylene of high density. Thus, for test bars made of such a material modulus values up to 3400 MPa were observed while simultaneously the breaking strength was as high as 130 MPa. In the interior of the article, the so-called core, said values were still higher, viz. 5000 MPa and 180 MPa for the modulus and breaking stress respectively.

In addition to these changes of properties there are a number of technical process advantages which the use of high pressure in injection moulding gives rise to. In this respect with reference to the above discussed instantaneous solidification of the melted material in the cavity the possibility of shortening the injection moulding cycle can be mentioned, a factor of primary importance to the economy of the process. Another advantage which should be pointed out in this context is the possibility to use plastic qualities in injection moulding which normally owing to too high a viscosity cannot be processed with this method (extrusion qualities).

For these reasons it is clear that an increase of the pressure in injection moulding represents an obvious improvement of the technique of today wherein the pressures normally used do not exceed 200 MPa.

However, the method hitherto used for providing the intended pressure increase in the mould cavity, i.e. to provide the screw of the injection moulding machine with a special injector, or to use a high pressure injector working separately from the screw cannot be quite free from certain disadvantages. It is i.a. observed that such devices normally cannot be mounted on existing machines. Instead it is necessary to use specially constructed machines. Furthermore, such machines are not yet available on the market. The most important disadvantage of devices of the type just mentioned is that the high pressure together with the large stresses caused thereby act on a comparatively large part of the machine, which explains the necessity of working with specially constructed machines constructed with said stresses as a basis. In this context the design of the cylinder and the screw/injector is especially problematic. In addition there are problems in the selection of material for these machine components which in addition to the considerable pressure also must stand a comparatively high working temperature.

An additional disadvantage of the type of existing machines which work with a high pressure injector mounted on the screw (FIG. 2) is the fact that the volume of the moulded part must be kept relatively small as compared to what otherwise is possible to obtain with injection moulding machines of today. The reason for this is the area reduction between the screw and high pressure injector which is required for obtaining the intended pressure increase. This also restricts the volume of the plastic melt in the storage chamber before the screw/injector.

The object according to the present invention is to eliminate the disadvantages caused by the use of current injection moulding technique using high pressures, e.g. such as disclosed in the Swedish Patent Specification No. 401,129, by means of a simple, pressure generating device intended to be attached directly to the mould and by means of simple plunger movements during the injection cycle bringing the pressure to the previously stated desired pressure level of 300–700 MPa while simultaneously closing the mold cavity from the injection channels. This enables the working with quite conventional machines without any requirements as to reconstruction since the injection now takes place in a conventional manner while the device intended to increase the high pressure only acts on the mould part of the machine. When the material in the accumulator chamber has solidified the force from the plunger will work essentially along this.

The pressure generating devices disclosed herein can easily be mounted on any mould constructed to stand the increased pressure without losing its normal function. This refers first of all to sufficient mechanical stiffness and strength. A special advantage of the present invention is the possibility to move the pressure generating device according to need from one mould to another. Thus, it is not necessary to provide each mould intended for injection moulding at elevated pressure with a special pressure generating device but one can work with only one such device which according to need is mounted on different moulds. This is a further illustration of the flexibility which characterizes the new device. To this comes the obvious advantage of being able to use injection moulding machines of conventional type.

In the enclosed drawings

FIG. 5 illustrates the same machine with a high pressure unit (open mould);

FIG. 6 shows a pressure-time diagram for the injection moulding process with the device according to the present invention;

FIG. 7 illustrates the mould cavity with plunger and non-return flow valve in its upper position wherein (7a) illustrates an accumulator chamber in a straight performance and (7b) an accumulator chamber in a conical performance and (9) is immersion heater;

FIG. 8 illustrates the mould cavity with plunger and non-return valve in its lower position;

FIG. 9 illustrates the mould cavity with plunger and the auxiliary accumulator chamber turned 90 degrees and (12) is parting line;

FIG. 10 shows a sequence diagram illustrating the injection moulding process when using a pressure device according to the present invention;

FIG. 11 illustrates a control system for controlling the cavity pressure when using a pressure device according to the present invention wherein (10) is a control unit and (11) is a pressure sensor.

Figure 1:
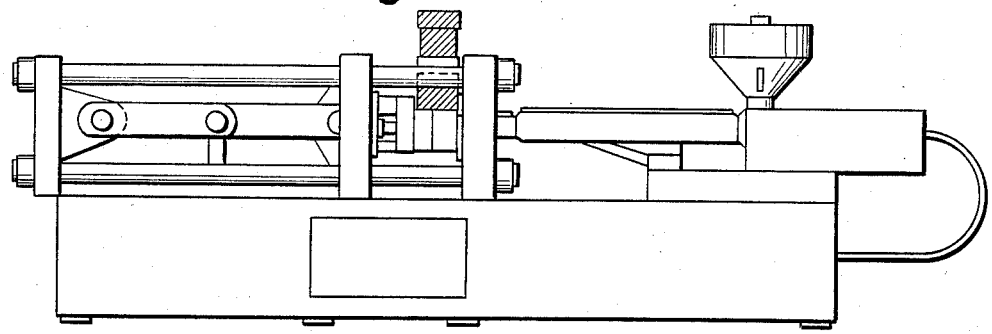
FIG. 1 illustrates the principal mounting of the pressure generating devive on the mould of a conventional injection moulding machine.
Figure 2:
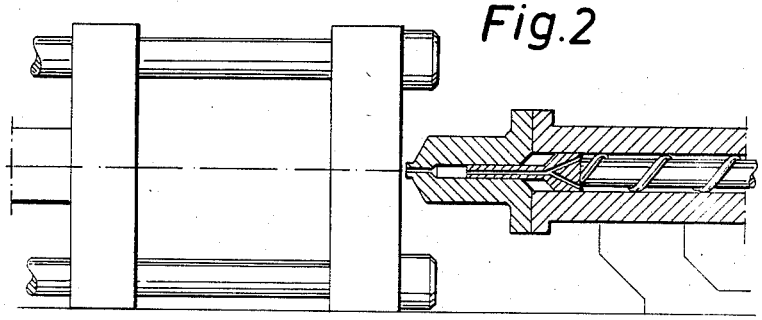
FIG. 2 illustrates an injection moulding machine with a screw on the end of which a high pressure injector has been mounted in a conventional manner.
Figure 3:
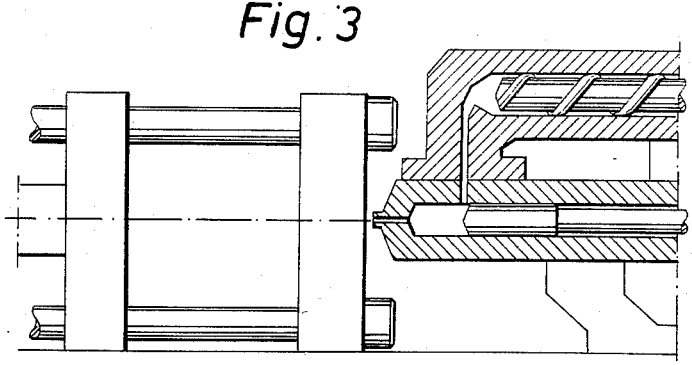
FIG. 3 illustrates an injection moulding machine wherein the plastication cylinder and the high pressure injector have been placed separately in parallel with each other.

In order to illustrate the more advantageous construction and flexibility of the novel device when used, as said properties are reflected in a comparison with machines of conventional construction, FIGS. 1–3 illustrate on one hand the fundamental mounting of the novel device on the mould in a conventional injection machine (FIG. 1) and on the other hand an injection moulding machine of current type for use with elevated pressure wherein two different embodiments of the latter type have been included. In one case (FIG. 2) a machine provided with a screw on the end of which a high pressure injector has been mounted is illustrated while in the other case (FIG. 3) an injection moulding machine is illustrated wherein the plastication cylinder and the high pressure injector have been placed separately in parallel with each other. It is to be noted that the novel device, such as schematically illustrated in FIG. 1, can be mounted on an optional injection moulding machine when the injection takes place in a conventional manner while the generation of the elevated pressure takes place separately from the other machinery by means of a device attached to the mould.

Figure 4:
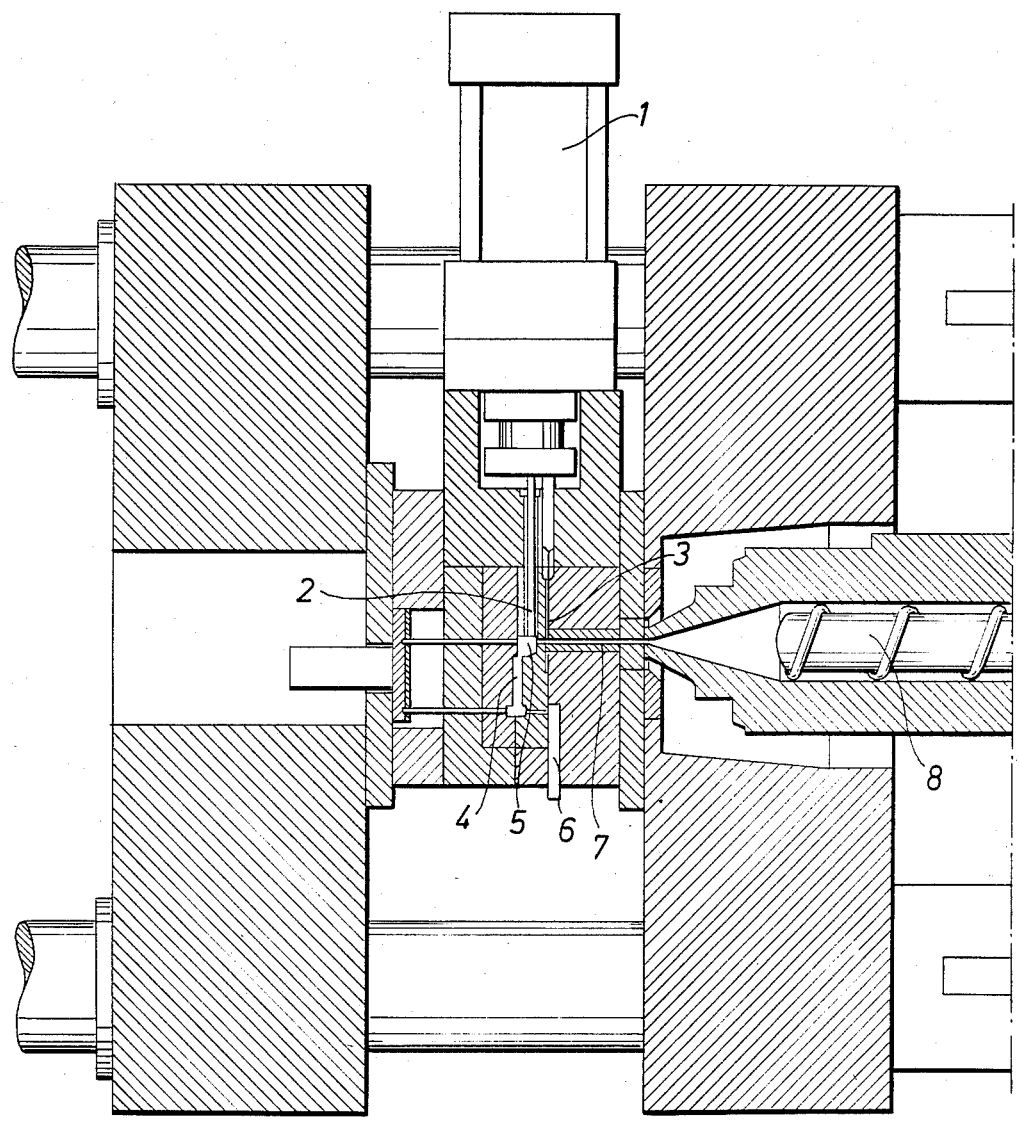
FIG. 4 illustrates an injection moulding machine with a high pressure unit according to the present invention (closed mould) wherein (1) is hydraulic cylinder, (2) is plunger, (3) is non-return flow valve, (4) is moulded part, (5) accumulator chamber, (6) is pressure sensor, (7) is hot runner and (8) is plastification screw.

The above outlining of the principal method of operation and advantages of the novel device as compared to devices of existing type will now be followed, with reference to the skeleton drawings in FIGS. 4 and 5, of a detailed description of the mechanical construction of the device concerned wherein the pressure in the mould cavity is generated with a hydraulic cylinder as a pressure generating part. Of course, if desired, the pressure generating part can consist of mechanical devices of other types which are well-known per se to the ones skilled in the art.

The injection moulding progress with the present method differs essentially in certain points from the conventional injection moulding cycle. The injection moulding progress now obtained can be divided into four steps (a–d). FIG. 6 illustrates said four steps in a pressure-time diagram.

a. The feeding of the mould cavity takes place in a normal manner, i.e. the plastication screw presses the melt into the mould cavity. Said function is controlled by the injection system of the machine. The pressure can be maintained relatively low (20–100 MPa). FIG. 7 illustrates the mould cavity when the injection is complete.

b. At the moment when the injection pressure is released the plunger starts moving into the auxiliary sprue accumulator. Said function can be controlled by normally used control systems, which are described more in detail later on. Since the plunger is brought down into the auxiliary sprue accumulator the pressure in the mould cavity will be increased. The increase rate of the pressure is adjusted over a flow valve in the oil feed to the pressure side of the hydraulic cylinder. FIG. 8 illustrates the mould cavity after the application of the high pressure.

A closer study of the auxiliary sprue accumulator (FIG. 8) shows that the plunger acts on an area with a diameter which is less than that of the auxiliary sprue accumulator in order to prevent the application of the pressure on the material which already has been solidified from the wall of the accumulator and inwards. Thus, the plunger only acts on the material which is still in a melted condition. As is shown in FIG. 7b the auxiliary sprue accumulator can be made slightly tapered (increasing radius towards the bottom of the accumulator) in order to facilitate the maintainance of a core corresponding to the diameter of the pressure pin in melted condition for the whole motion path of the plunger. FIG. 7b also illustrates another modification which can be made in this case in order to prevent a premature solidification in the zone between the auxiliary sprue accumulator and the moulded part. This is provided by placing an immersion heater near to said transition zone between the auxiliary sprue accumulator and the moulded part.

In the case that the auxiliary accumulator chamber is completely heated, which means that the plastic does not solidify in the contact with the wall of the auxiliary sprue accumulator the plunger and the auxiliary sprue accumulator can have the same diameters.

An advantage obtained by means of diameter difference between the auxiliary sprue accumulator and the plunger is that the risk of squeeze forces between plunger and cylinder which arise if plastic material is pressed there between is reduced. Said problem is reduced when the plunger works outside the sealing cylinder. Since this especially is a problem in the processing of filled plastics the present process should also be well suited for such plastics.

Simultaneously with the plunger a non-return flow valve moves downwards and prevents return flow and that the pressure propagates into the plastication cylinder. The non-return flow valve blocks after about two millimeters of movement and then keeps blocked during the remaining passage which the plunger and non-return flow valve move downwards. For machines which are equipped with a shut-off nozzle in the front part of the plasticating cylinder the return flow can be prevented with said nozzle.

c. The hydraulic pressure and thus the pressure in the mould cavity is kept constant during the remaining cooling time. Different pressure controlling system can be turned on during this phase of the injection moulding cycle such as e.g. vibrating injection or pressure control over a cavity pressure sensor which is described in more detail later on.

d. Before the opening of the mould the hydraulic cylinder is relieved and the plunger returns to its starting position and then the mould is opened and the moulded part is ejected.

For machines having a hydraulic ejector system the movement of the plunger if desired can be taking care of by this system. The hydraulic ejector system is placed between the movable platen and the clamping system of the machine. The ejector pin from the ejector system moves through a hole in the movable platen into the mould and thus, can take care of the movements of the plunger. The plunger in this case will work transversally to the parting line of the mould. FIG. 9 illustrates how the auxiliary sprue accumulator has been turned 90 degrees so that the plunger works via the hydraulic ejector system.

Furthermore, it is characteristic for the novel device that it is possible to connect the control system and hydraulics over existing components such as e.g. core pulling equipment or via the holding pressure which in this case is not used in a conventional manner.

The pressure period now can be substantially extended—without any extension of the cycle time—since the other routines of the machine, especially the feeding of new material in the screw can take place without the need of any pressure degeneration in the mould cavity (FIGS. 6 and 10).

The pressure control can according to the novel method take place during the whole solidification process. If a feed-back from the cavity pressure sensor back to the pressure cylinder is made a very accurate compensation of the shrinkage in the mould cavity is provided. This enables the production of moulded parts with high requirements as to size tolerances in an essentially simplified manner (FIG. 11).

Furthermore, it is possible to subject the content of the mould cavity to a vibrating pressure, a treatment which according to G. Menges, "9 Kunststofftechnisches Kolloquim des IKV in Aachen" (1978) page 8, can result in an improved property profile of the part, especially as to its dimension accuracy. Furthermore, vibrating pressure in high pressure injection moulding can give rise to larger and more favourable shearing forces which have proved to facilitate the formation of extended chains in the injection moulded part. Although devices generating a pulsating pressure in the mould are previously known the combination of such pulsations with an elevated pressure level represents an especially desirable treatment of the material enclosed in the mould cavity. Also the fact that now only said material is subjected to such vibrations, in contrast to the method proposed in other connections to generate the vibrations via the movement of the screw, means an apparent advantage.

Finally, the device according to the present invention provides very important economical advantages. While a conventional injection moulding machine constructed for pressures up to 600 MPa should involve an additional cost of the order 50,000 U.S. $ as compared to an injection moulding machine working with normal pressure the cost for a device in accordance with the present invention is only about one tenth of said sum. In spite of the inconsiderable capital demand as compared to current methods the novel process is more flexible not only as to the possibility of combining it with current injection moulding machinery but also as to the manner in which the elevated pressure in the mould is generated and controlled during an injection moulding cycle.

Of course it is also possible to make use of the pressure generating device in injection moulding with common pressure, i.e. pressure of up to about 200 MPa. In this context the advantages stated above in injection moulding with high pressure which is due to the fact that the pressure generating device works separately from the plasticating screw are obtained, such as the possibility to extend the pressure time without any extension of the cycle time, the possibility to provide pressure control during the whole solidification course, the possibility of subjecting the contents of the mould cavity to vibrating or pulsating pressure etc.

We claim:

1. A method of injection moulding with a machine having injection means comprising:
    firstly injecting melt with the injection means into a mould cavity under a first pressure not exceeding normal injection moulding pressure;
    secondly, applying a second pressure of the order of 200–1000 MPa in the mould cavity independently of the injection means and substantially greater than said first pressure, while preventing flow back of melt from the mould cavity into the injection means during application of said second pressure;
    releasing said second pressure immediately prior to opening the mould cavity; and
    opening the mould cavity and ejecting a moulded article therefrom.

2. The method as claimed in claim 1 in which the second pressure is generated by a hydraulic cylinder and plunger independent of the injection means.

3. The method as claimed in claim 1 in which the second pressure is generated by a hydraulic cylinder and plunger acting on the mould cavity by entry of the plunger into an auxiliary melt holding chamber communicating with the mould cavity.

4. The method as claimed in claim 1 including the step of sensing the second pressure whereby shrinkage of said moulded article can be controlled.

5. The method as claimed in claim 1 in which said second pressure is pulsating.

* * * * *